United States Patent Office 2,749,230
Patented June 5, 1956

2,749,230

PLANT GROWTH STIMULANTS CONTAINING WATER INSOLUBLE SALTS OF PENICILLIN

Murray Arthur Kaplan, Syracuse, N. Y., assignor to Bristol Laboratories Inc., Syracuse, N. Y., a corporation of New York No Drawing. Application April 7, 1953,
Serial No. 347,407

5 Claims. (Cl. 71—2.4)

This invention relates to a new plant food and, more particularly, to a plant fertilizer producing more rapid growth comprising a salt of penicillin.

Hitherto, it has been possible to stimulate the growth of plants, e. g. radishes, oats, grass, only by adding natural material deficient in the soil, such as nitrogen or metallic ions, by altering alkalinity or by altering temperature and exposure to light and moisture. Certain chemicals have been found to increase the ability of fruit to cling to the tree and to alter the color changes of fruit but none are known which may be added to increase the growth of plants, either to shorten the time or to increase the final size.

It is an objective of the present invention to provide a composition which, when applied to plants in liquid or solid form, increases the growth of the plants either to shorten the time required to reach maturity or to produce an increase in the final size or vigor of the plant.

The objectives of the present invention have been achieved and there is now discovered, according to the present invention a plant food comprising a salt of penicillin.

This plant supplement includes one or more of many salts of penicillin, e. g. water soluble salts of penicillin such as sodium, potassium, and ammonium penicillin G, calcium penicillin G, aluminum and other metal salts of penicillin G, procaine penicillin G and many highly water-insoluble salts of penicillin G. For example, we prefer N,N'-dibenzylethylenediamine dipenicillin G (290) but also use 1-ephenamine penicillin G, dehydroabietylamine penicillin G (200) (U. S. Patent #2,585,436), para-amino biphenyl penicillin G (1010) (U. S. Patent #2,588,517), dibenzylamine penicillin G (1500) (U. S. Patent #2,585,- 432), 1,1-diphenyl-3-(N-piperidyl)propane penicillin G (500) (U. S. Patent 2,578,651), N,N'-bis-(cyclohexylmethyl)-ethylenediamine dipenicillin G (490), N,N'-bis(2-hydroxy-3,5-dimethylbenzyl)ethylenediamine dipenicillin G (550), N,N'-di(n-heptyl)ethylenediamine dipenicillin G (500), N-isopropyldehydroabietylamine penicillin G (100), N,N'-bis-(dehydroabietyl)ethylenediamine dipenicillin G (100), N,N'-dibenzhydryl-ethylenediamine dipenicillin G (240), N,N'-bis(1,1,3,3-tetramethylbutyl)ethylenediamine dipenicillin G (1000), benzhydryl-di-isopropyl-amine penicillin G (500), N-furfuryl-dehydroabietylamine penicillin G (210), N,N'-bis(alpha-methylbenzyl)-ethylenediamine dipenicillin G (950), pyridium penicillin G (800), beta-para-cyclohexyl-cyclohexylamine penicillin G (1800), dodecylamine penicillin G (300), N-(gamma,gamma-diphenyl)pentylmorpholine penicillin G (900), alpha-phenyl-beta-dibenzylaminoethanol penicillin G (75), N,N'-dibenzylpiperazine dipenicillin G (90), N,N'-difurfurylethylenediamine dipenicillin G (2000), phenylalanine N-amyl ester penicillin G (800), β,β'-bis-dehydroabietylaminoethyl ether dipenicillin G (150), β-thujylamine penicillin G (200), and N(omega,omega-diphenyl)pentylmorpholine penicillin G (900), N-benzyl-dehydroabietylamine penicillin G (200), and N-cyclohexyl-dehydroabietylamine penicillin G (50), and, in addition, those penicillin salts disclosed by U. S. Patent 2,627,491 which have a solubility of less than 5000 units/ml. in water. The figures in parenthesis are the approximate solubilities in water in units per ml.

While the present invention has been described with particular reference to penicillin G, it is to be understood that the salts of other penicillins are also included within the scope of this invention. For instance, the penicillins G, F, X, O, dihydro F and K, and mixtures of two or more such penicillins, particularly mixtures containing at least 85% penicillin G, are included within the scope of this invention.

These salts may be mixed into the solid or liquid base of the plant supplement or may be prepared in situ.

Example I

The addition to a fermentation of about 60 milligrams of N,N'-dibenzylethylenediamine acetate per 100,000 units of penicillin as determined by assay will precipitate in and upon the mat N,N'-dibenzylethylenediamine dipenicillin G; the mat is collected by filtration and used as the plant supplement. In this way many minerals and nitrogen are introduced into the final supplement in an efficient and economical manner. The mat may, but need not, be dried before use. In addition, mat from ordinary fermentations, without special addition of precipitants such as N,N'-dibenzylethylenediamine, contains considerable useful penicillin, mainly as the calcium salt, and is found to be an excellent plant supplement after collection by filtration.

Example II

Powdered salts of penicillin, e. g. procaine penicillin G, potassium penicillin G, are added to standard nitrogenous or mineral fertilizers and found to stimulate the growth of plants when used in the normal manner.

Example III

Soluble salts of penicillin, e. g. potassium penicillin G, introduced into irrigation water, are found to stimulate growth by comparison with plants subjected to the same conditions but lacking the penicillin salt.

The compositions of the present invention thus may include, in addition to one or more salts of penicillin G, sources of nitrogen, phosphorous and mineral elements such as potash. These may be derived from pure chemicals or may be in crude form in commercially available sources, such as the penicillin mat of Example I above.

If desired, a buffering agent may be added, such as 0.25 to 5.0 percent by weight, and preferably 0.5 percent, of sodium citrate or 1.0 to 7.5 percent sodium phosphates and preferably 2.6 percent sodium dihydrogen phosphate and 2.4 percent disodium hydrogen phosphate to make a total of five percent by weight of the total composition. When appropriate, as in the presence of excess added procaine free base, the suspension may be buffered by the addition of free acids, e. g. citric acid, phosphoric acid. If desired, a stabilizing agent may be added, such as sodium hexametaphosphate or hexamethylenetetramine. From about 0.2 to 5.0 percent hexamethylenetetramine is used, and preferably from 0.5 to 2.0 percent on a weight per volume basis. The use of buffering or stabilizing agents is not essential, however.

If desired when these plant supplements are formulated as aqueous suspensions of insoluble salts of penicillin, suspending or dispersing agents may be used. Examples of these are sodium carboxymethylcellulose, lecithin, Spans and Tweens. Other suspending and dispersing agents include lecithin, Falba, cholesterol, Span 20, Span 40, Span 60, Span 80, the Tweens, Amerchols, sodium alginate, potassium alginate, ammonium alginate, calcium alginate, alginic acid, propylene glycol alginate, polyoxyalkylene derivatives of sorbitol fatty acid esters, urea and sodium p-aminobenzoate.

Special "resuspending agents," some of which are also stabilizing agents, may also be added, preferably in amounts of about 0.1 to 2.0 percent. These include inositolphosphoric acids and their non-toxic salts (e. g. sodium phytate), glyceryl monostearate, Greelon CD, polyoxyalkylene-sorbitols (e. g. polyoxypropylene(6) sorbitol; polyoxyethylene(20) sorbitol; polyoxyethylene(100) sorbitol), no more than 2.0 percent of an injectable oil such as peanut oil, and condensation products, having molecular weights greater than 1500, of ethylene oxide with a condensation product of propylene oxide with propylene glycol (e. g. Pluronic F 68). The Spans are hexitol anhydride (hexitans and hexides derived from sorbitol) partial esters of common long-chain fatty acids (e. g. lauric, palmitic, stearic, oleic) and the Tweens are polyoxyalkylene derivatives of the Spans.

It will be understood that, without departing from the spirit of the invention or the scope of the claims, various modifications may be made in the specific expedients described. The latter are illustrative only and are not offered in a restrictive sense, and there is no intention of excluding any equivalents of the features shown and described or portions thereof.

I claim:

1. A composition to stimulate the growth of plants comprising a water-insoluble salt of penicillin G and utilizable nitrogen, phosphorus and essential minerals.

2. A composition to stimulate the growth of plants comprising procaine penicillin G and utilizable nitrogen, phosphorus, and essential minerals.

3. A composition to stimulate the growth of plants comprising N,N'-dibenzylethylenediamine dipenicillin G and utilizable nitrogen, phosphorus, and essential minerals.

4. A composition to stimulate the growth of plants comprising dibenzylamine penicillin G and utilizable nitrogen, phosphorus, and essential minerals.

5. A composition to stimulate the growth of plants comprising dehydroabietylamine penicillin G and utilizable nitrogen, phosphorus, and essential minerals.

References Cited in the file of this patent

Life Magazine, "Orange Blight," Jan. 19, 1948, vol. 24, No. 3, pages 51, 52, 54.

Richmond News Leader, Penicillin Thwarts Cancer in Plant Life, Ralph Dighton, page 9.

Boyce Thompson Institute, vol. 16, No. 8, pages 387–407.

Nature, Penicillin as Plant Hormone, vol. 158, No. 4016, Oct. 19, 1946, page 555.

Manufacturing Chemist, Antibiotics, Dec. 1952, pages 509–511.